United States Patent [19]

Gaus et al.

[11] Patent Number: 5,707,146
[45] Date of Patent: Jan. 13, 1998

[54] HIGH-TEMPERATURE THERMOELEMENT CALIBRATION

[75] Inventors: Rainer Gaus, Holzkirchen; Michael Dienz, Rosenheim; Kai K. O. Bär, Ottobrunn, all of Germany

[73] Assignee: Industrieanlagen-Betriebsgesellschaft mbH, Ottobrunn, Germany

[21] Appl. No.: 545,807

[22] PCT Filed: May 6, 1994

[86] PCT No.: PCT/EP94/01463

§ 371 Date: Jan. 17, 1996

§ 102(e) Date: Jan. 17, 1996

[87] PCT Pub. No.: WO94/27124

PCT Pub. Date: Nov. 24, 1994

[30] Foreign Application Priority Data

May 8, 1993 [DE] Germany .................. 43 15 386.0

[51] Int. Cl.$^6$ ............................................. G01K 15/00
[52] U.S. Cl. ........................................ 374/1; 374/121
[58] Field of Search .......................... 374/1, 2, 9, 121, 374/126, 128, 130

[56] References Cited

U.S. PATENT DOCUMENTS

| | | |
|---|---|---|
| 3,115,030 | 12/1963 | McHenry ................................ 374/2 |
| 3,698,813 | 10/1972 | Aisenberg ............................ 374/1 X |
| 4,659,234 | 4/1987 | Brouwer et al. ...................... 374/121 |
| 4,854,727 | 8/1989 | Pecot et al. ......................... 374/1 X |
| 4,984,902 | 1/1991 | Crowley et al. ........................ 374/1 |

OTHER PUBLICATIONS

Barber, et al., "Thermocouples above 600°C: Infra-red thermometers and optical pyrometers", *Measurement & Control*, vol. 12, No. 5, May, 1979, pp. 207–213.

Fullin, et al., "A Centralized Temperature Control System for Diffusion Furnaces", *Solid State Technology*, Nov. 1972, pp. 40–43.

Schreck, et al., "Calibration of microsize thermocouples for measurements of Jan. surface temperature", *Review of Scientific Instruments*, vol. 64, No. 1, pp. 218–220, 1993, New York, U.S.

*Primary Examiner*—Richard Chilcot
*Assistant Examiner*—Paul D. Amrozowicz
*Attorney, Agent, or Firm*—Marshall, O'Toole, Gerstein, Murray & Borun

[57] ABSTRACT

The invention relates to a method and its implementation for the rapid calibration of thermoelements, preferably in the temperature range from 700° C. to 1800° C. The calibration apparatus consists of commercially available components, is therefore comparatively very economical, light and portable; the energy consumption is low, because the conventional heating chamber can be eliminated. Errors of the first and second kind associated with the thermoelements to be calibrated are detected.

5 Claims, 2 Drawing Sheets

HIGH-TEMPERATURE THERMOELEMENT CALIBRATION

The invention relates to a method and the apparatus for the implementation thereof for calibrating thermoelements in the temperature range from room temperature to ca. 2800° C. with a preferred working range of about 700°–1800° C. according to the characterizing part of Claim 1.

The standard calibration methods previously used for industrial purposes are restricted to maximal temperatures up to about 1300° C. and are characterized in that the thermoelements to be calibrated are heated homogeneously by contact in calibration furnaces, customarily by resistance heating. The term "homogeneously" signifies that the thermoelement must be heated not at its tip but over a region of about 200 mm; however, ordinarily that is a region in which during actual operation a temperature gradient is present. A special calibration method, suitable primarily for laboratory use, employs the melting of materials, as a rule in the form of wires, with accurately known melting point (Fritz Lieneweg: Handbook of Technical Temperature Measuring, Vieweg 1976). Another calibration method is known in which temperatures up to about 2000° C. are determined by measuring the thermal noise resulting from thermal excitation of a comparison element kept at the same temperature level (H. Brixy: Combined Thermoelement-Noise Temperature Measuring, Nuclear Research Plant, Jülich Gmbh; Institute for Reactor Design, Research Report '86 Jul-2051). However, this method requires extremely elaborate and cost-intensive signal processing.

The disadvantage of this state of the art is that because of the large heated region errors of the first and second kind cannot be detected in these regions. The method requires heating of a large region in order to ensure that the tip of the thermoelement is brought fully to the furnace temperature and does not remain at a $-\Delta T$ due to effects of thermal conductance byway of the wires. Errors of the first kind derive primarily from diffusion processes and alloy-altering effects that change the composition of the material and hence its thermoelectric properties. Errors of the second kind are produced when thermoelements, the material of which has been altered so as to produce errors of the first kind, are employed in the range of other temperature gradients.

The object of the invention is thus to provide a thermoelement calibration method and the associated apparatus such that errors of the first and second kind can be demonstrated quantitatively with reference to a predetermined temperature gradient and calibrations can be carried out at temperatures up to at least 1800° C.

Figure 1:
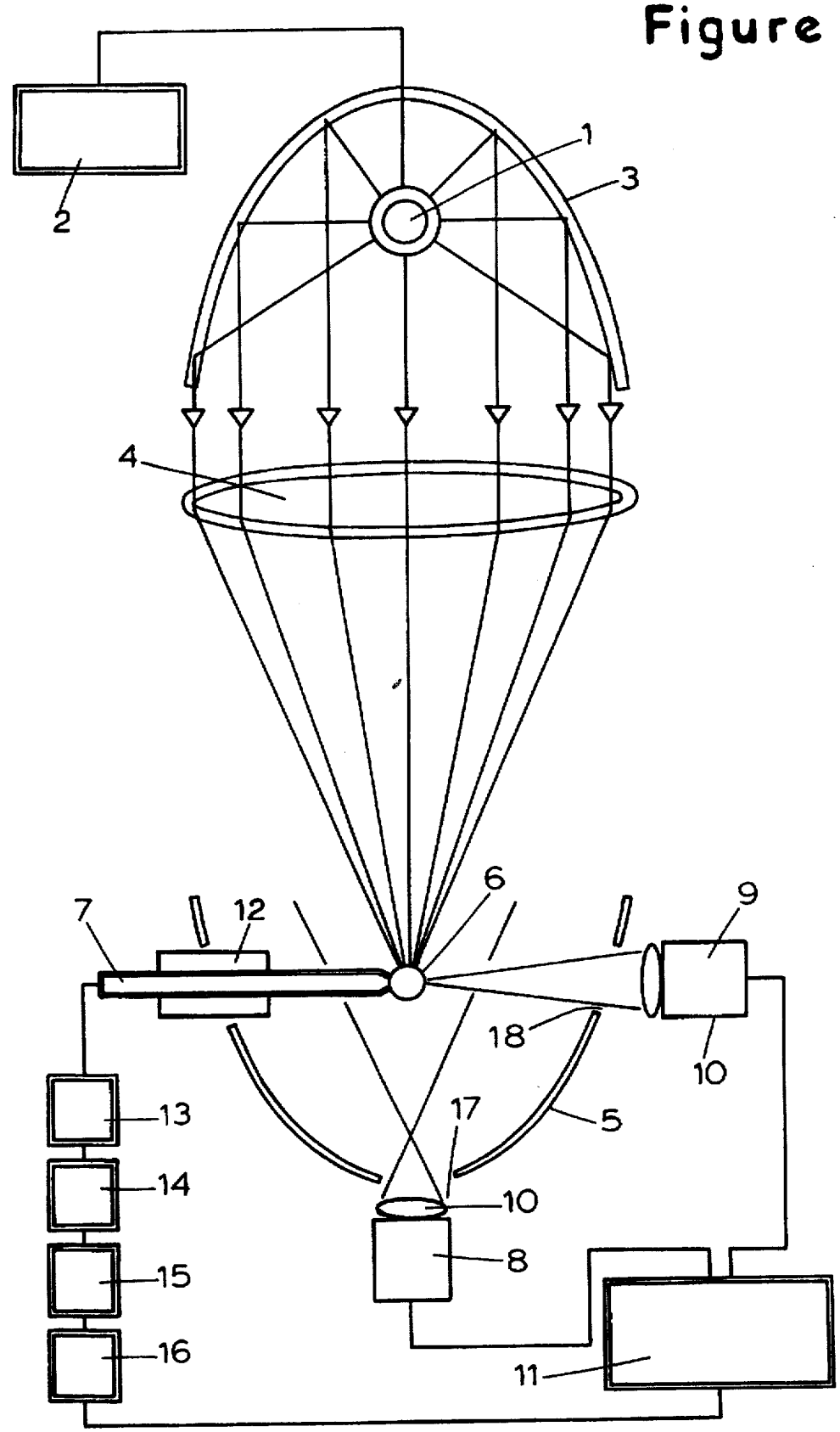
FIG. 1 is a schematic view of an apparatus, according to the present invention, for calibrating thermoelements.
Figure 2:
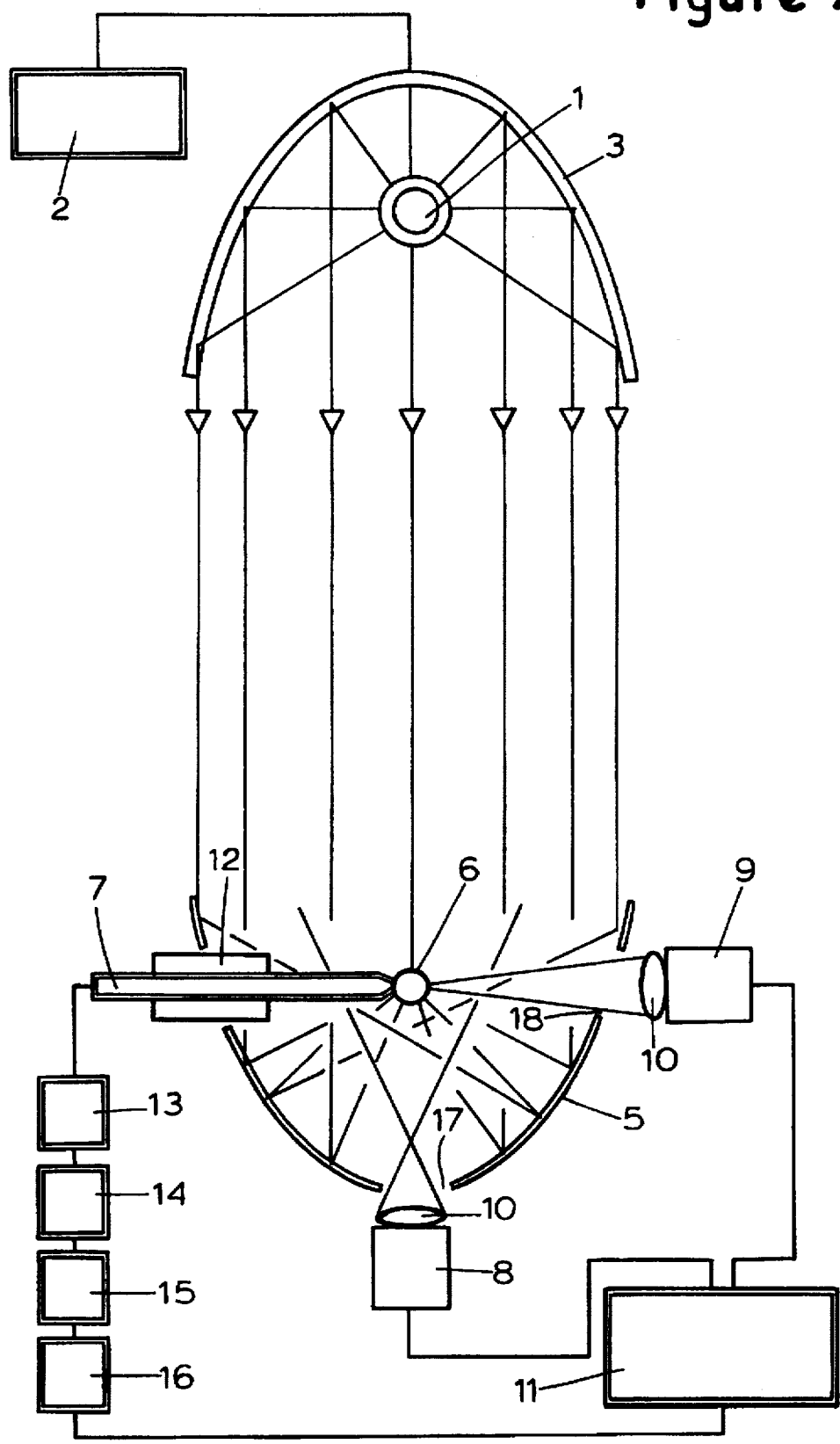
FIG. 2 is a schematic view similar to FIG. 1 of another embodiment of the present invention.

This object is achieved in accordance with the invention as follows: IR radiation emitted by a modulated (e.g. alternating-current operation) light source 1, preferably a halogen point radiator, can be adjusted to specific temperature levels in a simple manner by means of dimmer 2. The modulation of the light source allows the radiation emitted by the thermoelement tip 6 to be separated from the reflected part of the radiation from the light source. The IR radiation from the point radiator 1 is bundled by means of a reflector 3 in such a way that, depending on the configuration selected, parallel light is focussed by way of a lens system& (FIG. 1) or a parabolic reflector 5 (FIG. 2). In both embodiments the radiation is focussed onto the thermoelement tip 6. With this kind of heating only the tip 6 of the thermoelement 7 is heated to the desired calibration temperature. In this process a positioning device 12, preferably made of $Al_2O_3$, serves to fix the thermoelement tip 6 reproducibly at the focal point. Because it is necessary that the emissivity be known exactly, in accordance with the invention at least 2 pyrometers are employed in such away that the first pyrometer 8 measures the AC and DC components of the heating radiation and the second pyrometer 9 measures the AC and DC components of the thermoelement tip 6. The AC component is the amplitude of the radiation modulation and the DC component is the radiation output averaged over the modulation. In front of each pyrometer is a focussing lens system 10, to which access is provided by openings 17 and 18 in the reflector 5. The focal point of the lens system 10 of the pyrometer 9 coincides with the thermoelement tip 6; the focal point of the lens system 10 of the pyrometer 8 is positioned below the thermoelement tip 6 in such a way that the image of the entire reflector 3 is formed (apart from the negligible shadow cast by the thermoelement tip 6). The measurement signals generated by the pyrometers 8 and 9 are passed to a microprocessor 11, which takes the ratio of the two AC components to determine the emissivity of the thermoelement tip 6 in real time and, on the basis of the emissivity and hence the reflectivity, determines from the DC components the temperature of the thermoelement tip 6, taking into account the multireflection of the heating radiation. These measured data are compared with the measurement signal produced by the thermoelement 7, which is directly related to the temperature. The thermoelement signal consists of an EMF (electromotive force) that is measured byway of a cold site 13, amplified and linearized. Cold site 13, amplifier 15, linearizer 14 and data recorder 16 are state of the art and are therefore not shown in the figures.

The special advantages of the method in accordance with the invention and its technical implementation are that previously unattainable measurement ranges, up to 2800° C., are possible and that only a very small point must be heated, so that very little heating power is required. The reference temperature is monitored by non-contact measurement and hence very rapidly; the apparatus is altogether relatively simple, light, and portable, and furthermore the calibration times can be extremely reduced. It is further of importance that no control system is required for the measurements. The apparatus consists substantially of commercially available components and despite its high performance is distinctly less expensive than previous solutions.

Regarding signal processing: the AC signals are recorded by means of very rapid analog/digital cards and the integration over the modulation can be carried out by means of Fourier-transformation cards.

Although the normal working range of the calibration method in accordance with the invention is 700°–1800° C., by modifying the pyrometer system (selecting another pyrometer sensor) the application temperature can be lowered considerably, in which case the upper limit of the working range decreases correspondingly. The entire calibration apparatus can also be operated in high vacuum within a vacuum chamber.

We claim:

1. Method of calibrating thermoelements in the temperature range from room temperature to about 2800° C., with a preferred working range from about 700° C. to 1800° C., characterized by the combination of the following procedural steps:

the radiation emitted by a modulated light source is focussed, after a parallel beam has been produced by a parabolic reflector, by a lens system onto the tip of a thermoelement;

the emissivity and the temperature of the tip of the thermoelement are measured by means of first and second pyrometers, each having its own pyrometer lens system; and in a data-processing system the emissivity and temperature of the tip measured by the first and second pyrometers are compared with the temperature measured by the thermoelement.

2. Method according to claim 1, characterized in that the customary calibration range is about $700 \leq T \leq 1800°$ C. and that calibration peak temperatures of about 2800° C. can be realized.

3. Method according to claim 1, characterized in that lower calibration ranges can be achieved by a different choice of first and second pyrometers.

4. Method according to claim 1, characterized in that the temperature of the light source can be continuously adjusted.

5. Method according to claim 1, characterized in that the parallel beam produced by the reflector is focussed not by the lens system but by a parabolic reflector having first and second openings for communication with the first and second pyrometers respectively.

* * * * *

UNITED STATES PATENT AND TRADEMARK OFFICE
CERTIFICATE OF CORRECTION

PATENT NO. : 5,707,146
DATED : January 13, 1998
INVENTOR(S) : RAINER GAUS, ET AL.

It is certified that error appears in the above-identified patent and that said Letters Patent is hereby corrected as shown below:

Title page item [56],
  References Cited - OTHER PUBLICATIONS change "Schreck, et al., "Calibration of microsize" to -- Schreck et al., "Calibration of micron-size --

Col. 1, line 37, change "byway" to --by way--

Col. 1, line 67, change "&" to --4--

Col. 2, line 9, change "away" to --a way--

Col. 2, line 34, change "byway" to --by way--

Signed and Sealed this

Twenty-fifth Day of April, 2000

*Attest:*

Q. TODD DICKINSON

*Attesting Officer*        *Director of Patents and Trademarks*